(12) United States Patent
Lee

(10) Patent No.: US 11,558,576 B2
(45) Date of Patent: *Jan. 17, 2023

(54) METHODS AND SYSTEMS FOR REPRESENTING VIDEO IN CONTINUOUS TIME

(71) Applicant: Solsona Enterprise, LLC, San Diego, CA (US)

(72) Inventor: Chong Lee, Carlsbad, CA (US)

(73) Assignee: Solsona Enterprise, LLC, San Diego, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/305,250

(22) Filed: Jul. 2, 2021

(65) Prior Publication Data

US 2021/0344859 A1 Nov. 4, 2021

Related U.S. Application Data

(63) Continuation of application No. 16/839,136, filed on Apr. 3, 2020, now Pat. No. 11,258,978.

(60) Provisional application No. 63/199,039, filed on Dec. 3, 2020, provisional application No. 62/875,404, filed on Jul. 17, 2019.

(51) Int. Cl.
*H04N 5/378* (2011.01)

(52) U.S. Cl.
CPC .................................. *H04N 5/378* (2013.01)

(58) Field of Classification Search
CPC .......................... H04N 5/37455; H04N 5/378
See application file for complete search history.

(56) References Cited

U.S. PATENT DOCUMENTS

| 5,248,971 A | 9/1993 | Mandl |
| 5,461,425 A | 10/1995 | Fowler et al. |
| 5,515,046 A | 5/1996 | Mandl |
| 5,659,315 A | 8/1997 | Mandl |

(Continued)

OTHER PUBLICATIONS

Wakin, Michael B.; "A Study of the Temporal Bandwidth of Video and its Implications in Compressive Sensing"; Colorado School of Mines Technical Report; Aug. 15, 2012; 50 pages.

(Continued)

*Primary Examiner* — Lin Ye
*Assistant Examiner* — John H Morehead, III
(74) *Attorney, Agent, or Firm* — Lipsitz & McAllister, LLC

(57) ABSTRACT

The present invention encompasses methods and systems of representing video in continuous time. Photons incident on pixels in an imaging array are continuously captured using a continuous time imaging sensor array to produce respective continuous time analog signals without any discontinuity in time. At each pixel, the respective continuous time analog signal is modulated into respective continuous time binary analog signals. The continuous time binary analog signals from all pixels are aggregated to produce a frame free video. Each pixel may comprise a continuous time sigma delta modulator and a photodiode having a capacitance. At each pixel, the respective continuous time analog signal is modulated using the continuous time sigma delta modulator to produce the corresponding continuous time binary analog signal. The capacitance of the photodiode functions as a charge integrator.

16 Claims, 14 Drawing Sheets

(56) References Cited

U.S. PATENT DOCUMENTS

| | | | | |
|---|---|---|---|---|
| 5,886,659 | A * | 3/1999 | Pain | H04N 3/155 348/E3.018 |
| 6,597,371 | B2 | 7/2003 | Mandl | |
| 7,362,365 | B1 * | 4/2008 | Reyneri | H04N 3/155 348/297 |
| 9,200,954 | B2 * | 12/2015 | Lin | H04N 5/378 |
| 11,258,978 | B2 * | 2/2022 | Lee | H04N 5/378 |
| 2002/0050518 | A1 * | 5/2002 | Roustaei | G06K 7/10811 235/454 |
| 2009/0295959 | A1 * | 12/2009 | Shoho | H04N 5/35554 348/294 |
| 2013/0112848 | A1 * | 5/2013 | Lin | H04N 5/3651 250/206 |
| 2013/0222584 | A1 * | 8/2013 | Aoki | H04N 7/18 348/208.1 |
| 2013/0308044 | A1 * | 11/2013 | Mitsunaga | H04N 5/2351 348/362 |
| 2013/0329053 | A1 * | 12/2013 | Jones | G06T 7/90 348/302 |
| 2015/0092036 | A1 * | 4/2015 | Koshiba | H04N 9/04557 348/71 |
| 2015/0245019 | A1 * | 8/2015 | Engelbrecht | H04N 17/002 348/175 |
| 2016/0360138 | A1 * | 12/2016 | Meynants | H01L 27/14634 |
| 2017/0041571 | A1 * | 2/2017 | Tyrrell | H04N 5/37455 |
| 2017/0242108 | A1 * | 8/2017 | Dussan | G01S 7/4868 |
| 2019/0026901 | A1 * | 1/2019 | Fu | G06T 7/20 |

OTHER PUBLICATIONS

Posch et al.; "A QVGA 143 dB Dynamic Range Frame-Free PWM Image Sensor With Lossless Pixel-Level Video Compression and Time-Domain CDS"; IEEE Journal of Solid-State Circuits; vol. 46, No. 1; Jan. 17, 2011; pp. 259-275.

Mandl et al.; "All-digital monolithic scanning readout based on sigma-delta analog-to-digital conversion"; Proc. SPIE 1684, Infrared Readout Electronics; Jul. 1, 1992; 9 pages.

Mandl et al.; "Design of a 12-megapixel imager with a nanowatt A/D converter at each pixel"; Proc. SPIE 5074, Infrared Technology and Applications XXIX; Oct. 10, 2003; 15 pages.

* cited by examiner

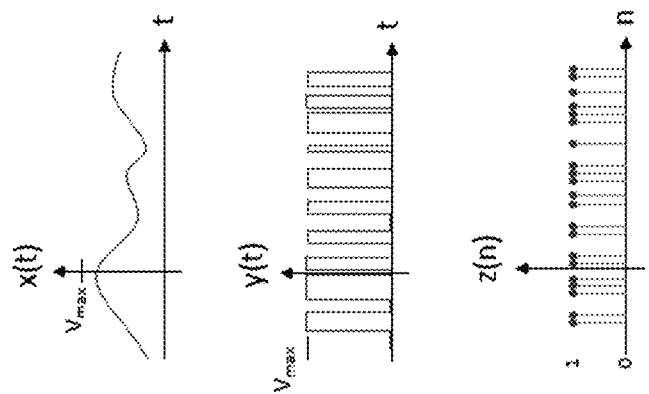
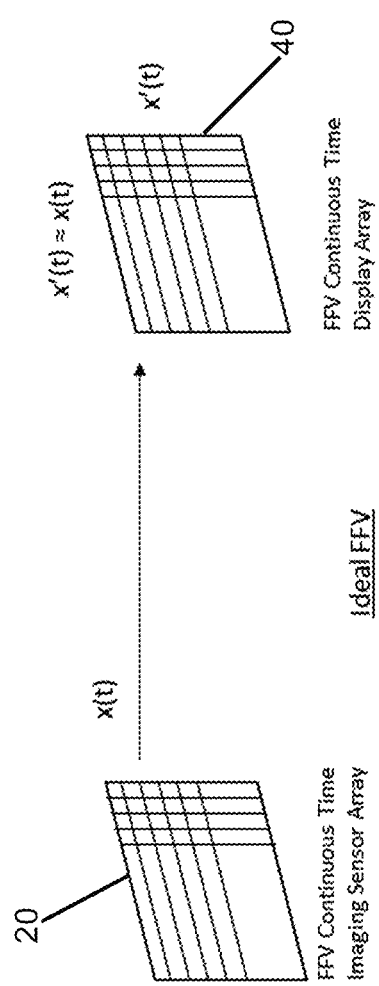
FIG. 3
FIG. 4

METHODS AND SYSTEMS FOR REPRESENTING VIDEO IN CONTINUOUS TIME

This application claims the benefit of U.S. provisional patent application No. 63/199,039 filed on Dec. 3, 2020 and is a continuation of commonly-owned co-pending U.S. patent application Ser. No. 16/839,136 filed on Apr. 3, 2020, which claims the benefit of U.S. provisional patent application No. 62/875,404 filed on Jul. 17, 2019, and each of which is incorporated herein and made a part hereof by reference.

BACKGROUND OF THE INVENTION

The present invention relates to the field of video capture and display. More specifically, the present invention relates to methods and systems for capturing and representing video in continuous time (also referred to herein as "frame free video").

Traditional video is frame-based video. Such frame-based video, including film-based movies, presents one frame of still picture after another in rapid succession, which produces the illusion of motion when the frame update rate is fast enough. Each "frame" is a complete static greyscale picture, which is readily apparent when the video or film is paused on one of the frames.

Eadweard Muybridge is credited with the first capture of motion on film in 1872 using an array of 12 cameras, as shown in FIG. 1. Modern video cameras still use the same basic principle discovered by Eadweard Muybridge in 1872. "Frame Rate" is one of the most prominent parameters in video. The higher the frame rate, the smoother the motion. Currently a frame rate of around 60 fps (frames per second) is used on most cameras. Typically, there is some information lost between the frames, due to shutter opening and closing, resulting in aliasing errors.

FIG. 2 shows an example embodiment of a prior art frame-based video process. In frame-based video, each frame of film or video is exposed when the shutter is open. In FIG. 2, the imaging sensor array 10 is comprised of pixels. The signal x(t) represents the incident photon flux (or photo current) at each pixel in the imaging array 10. An integrator 12 integrates x(t) integrated over $T_O$, the shutter open duration, to produce the signal y(t). The signal y(t) is sampled at the end of integration by a sample and hold amplifier S/H, reset (by discarding the incident photon) during $T_R$, the shutter closed duration, to produce the analog signal $y_s(t)$. During $T_R$, a new piece of film is positioned, or the photodiode is reset. The sample and hold amplifier S/H samples y(t) at down arrows to produce $y_s(t)$. The signal $y_s(t)$ is quantized and digitized by an analog to digital converter 14 to produce a digital signal z(n), which represents peak y(t) sampled and converted to a PCM (pulse code modulation) coded signal, representing one of the pixels in a 2-D image frame, at frame time n ($t=nT_S$). The digital signal z(n) can then be communicated over a transmission channel and converted at the destination back to an analog signal $y'_s(t)$ at a digital to analog converter 16. The signal $y'_s(t)$ is an approximation of the signal $y_s(t)$, and comprises the signal $y_s(t)$ plus quantization error. The display signal y'(t) at the display array 18 approximates the signal $y_s(t)$ and comprises a greyscale display output of the average brightness over one frame time. The signal y'(t) reproduces $y_s(t)$, which may have a different time profile than the shutter at the imaging sensor. The signal y'(t) is an approximation of x(t) except for the time aliasing due to the shutter time profile, finite integration window, and missing photons. This aliasing error cannot be separated out by any filtering. The bandwidth of y'(t) depends on the frame rate ($1/T_S$). The human visual system (HVS) has a response up to 60 Hz, requiring a frame rate greater than 120 Hz. However, when there is object motion or quick camera panning the temporal bandwidth of the scene often exceeds 60 Hz, therefore even 120 Hz is not sufficient. In those situations, the viewer sees multiple trailing edges or occasionally a stagecoach wheel turning backward.

It would be advantageous to overcome the inherent limitations of frame-based video and to enable video recording and playback in a manner more consistent with the human visual system. The methods, apparatus and systems of the present invention provide the foregoing and other advantages.

SUMMARY OF THE INVENTION

The present invention relates to methods and systems for capturing and representing video in continuous time (also referred to herein as "frame free video").

An example embodiment of a method for representing video in continuous time in accordance with the present invention comprises continuously capturing photons incident on pixels in an imaging array using a continuous time imaging sensor array to produce respective continuous time analog signals without any discontinuity in time. At each pixel, the respective continuous time analog signal is modulated into a respective continuous time binary analog signal. The continuous time binary analog signals from all pixels can then be aggregated to produce a frame free video.

At each pixel, the respective continuous time analog signal may be modulated using a continuous time sigma delta modulator to produce the corresponding continuous time binary analog signal. The sigma delta modulator may be one of charge-based or current-based.

In addition, at each pixel, the continuous time binary analog signal may be mapped to a discrete time binary digital signal consisting of 1's and 0's. The discrete time binary digital signals from all of the pixels in the imaging array may be aggregated to produce a corresponding binary bit-plane per each clock cycle of the sigma delta modulator to convert the frame free video to a frame free video stream. The frame free video stream may comprise a time series of the binary bit-planes.

The frame free video stream may be converted into a frame free video signal by at least one of manipulating, format converting, encoding, transcoding, compressing, storing, transmitting, and otherwise representing the frame free video stream.

The binary 1's and 0's from the discrete time binary digital signal may be mapped to a maximum value and a minimum value, respectively, to enable continuous time video processing or display.

The sigma delta modulator may comprise a feedback-based charge integrator that is connected to a photodiode. The photodiode is not reset throughout the operation of the imaging array. Continuous feedback from the feedback-based charge integrator is used to maintain a constant photodiode voltage.

In addition, current of the photodiode may be integrated continuously in time without saturating the photodiode by the feedback-based charge integrator to produce an integrated value which represents total photons converted to electrical charges. Each time the integrated value exceeds a threshold value, a fixed value may be subtracted from the integrated value to enable the feedback-based charge integrator to operate within an operating range of the feedback-based charge integrator. The series of subtracted values over time may result in a close approximation of the total integrated value, enabling the sigma delta modulator to produce the continuous time binary analog signal that is mapped to the discrete time binary digital signal.

The sigma delta modulator may further comprise: an op-amp with a non-inverting input held at a constant voltage and an inverting input coupled to an output of the photodiode, the op-amp outputting the integrated value; a feedback capacitor coupled to an output of the op-amp and the output of the photodiode to maintain the constant photodiode voltage; a slicer coupled to the output of the op-amp for determining whether the integrated value from the op-amp output exceeds the threshold value, the slicer output comprising the discrete time binary digital signal; and a charge digital to analog converter (qDAC) coupled to an output of the slicer and the inverting input of the op-amp which produces the fixed value to be subtracted.

The discrete time binary digital signal output by the slicer may be mapped to continuous time binary analog signal by the qDAC.

Each pixel in the imaging array may comprise a photodiode and a sigma delta modulator circuit. The sigma delta modulator circuit may have an output which is 1-bit binary valued.

Alternatively, the sigma delta modulator circuit may have an output which is more than 1-bit binary valued.

The sigma delta modulator may comprise a single feedback-based charge integrator or, alternatively, two or more feedback-based charge integrators that are connected to a photodiode. The photodiode is not reset throughout the operation of the imaging array. Continuous feedback from the feedback-based charge integrator(s) maintains a constant photodiode voltage.

The present invention also encompasses a system for representing video in continuous time. Such a system may comprise a continuous time imaging sensor array for continuously capturing photons incident on pixels of the imaging array to produce respective continuous time analog signals without any discontinuity in time. Each of the pixels may comprise a photodiode and a modulator circuit for modulating the respective continuous time analog signal into a respective continuous time binary analog signal. A processor may be provided for aggregating the continuous time binary analog signals from all the pixels to produce a frame free video stream. A continuous time display array may be provided for displaying the frame free video stream.

Various embodiments of the system of the present invention may also encompass the features and functionality of the method embodiments discussed above.

In a further example embodiment of a method of representing video in continuous time in accordance with the present invention, the charge integrator may be a capacitance-based charge integrator. For example, the capacitance of the photodiode may function as the charge integrator, or the photodiode in parallel with one or more capacitors may function as the charge integrator. In such an example embodiment, the method may comprise continuously capturing photons incident on pixels in an imaging array using a continuous time imaging sensor array to produce respective continuous time analog signals without any discontinuity in time. At each pixel, the respective continuous time analog signal is modulated into a respective continuous time binary analog signal. The continuous time binary analog signals from all pixels are aggregated to produce a frame free video. Each pixel may comprise a continuous time sigma delta modulator and a photodiode having a capacitance. At each pixel, the respective continuous time analog signal is modulated using the continuous time sigma delta modulator to produce the respective continuous time binary analog signal. The capacitance of the photodiode functions as a charge integrator.

The sigma delta modulator may be one of charge-based or current-based.

At each pixel, the continuous time binary analog signal may be mapped to a discrete time binary digital signal consisting of 1's and 0's. The discrete time binary digital signals from all of the pixels may be aggregated in the imaging array to produce a corresponding binary bit-plane per each clock cycle of the sigma delta modulator to convert the frame free video to a frame free video stream. The frame free video stream may comprise a time series of the binary bit-planes.

The frame free video stream may be converted into a frame free video signal by at least one of manipulating, format converting, encoding, transcoding, compressing, storing, transmitting, and otherwise representing the frame free video stream.

The binary 1's and 0's from the discrete time binary digital signal may be mapped to a maximum value and a minimum value, respectively, to enable continuous time video processing or display.

The photodiode is not reset throughout the operation of the imaging array. The charge integrator maintains a voltage range of the photodiode corresponding to a sum of a current of the photodiode and a negative of a feedback current of the sigma delta modulator.

The current of the photodiode is integrated continuously in time without saturating the photodiode by the charge integrator to produce an integrated value which represents total photons converted to electrical charges. Each time the integrated value exceeds a threshold value, a fixed value is subtracted from the integrated value to enable the charge integrator to operate within an operating range. The series of subtracted values over time may result in a close approximation of the total integrated value, enabling the sigma delta modulator to produce the continuous time binary analog signal.

In an example embodiment, the charge integrator may comprise the capacitance of the photodiode and a capacitor in parallel with the photodiode and coupled to an output of the photodiode. Alternatively, the charge integrator may comprise the capacitance of the photodiode and one or more capacitors in parallel with the photodiode and coupled to an output of the photodiode.

The sigma delta modulator may comprise: a slicer coupled to the output of the charge integrator for determining whether the integrated value from the charge integrator output exceeds the threshold value, the slicer output comprising the discrete time binary digital signals; and a charge digital to analog converter (qDAC) coupled to an output of the slicer and to the charge integrator, which produces the fixed value to be subtracted each time the integrated value exceeds a threshold value, enabling the charge integrator to operate within an operating range.

The discrete time binary digital signals output by the slicer may be mapped to the continuous time binary analog signals by the qDAC.

The sigma delta modulator may have an output which is 1-bit binary valued. Alternatively, the sigma delta modulator has an output which is more than 1-bit binary valued.

The present invention also encompasses a system for representing video in continuous time. Such a system may comprise a continuous time imaging sensor array for continuously capturing photons incident on pixels of the imaging array to produce respective continuous time analog signals without any discontinuity in time. Each of the pixels may comprise a photodiode and a sigma delta modulator circuit for modulating the respective continuous time analog signal into a respective continuous time binary analog signal. The system may also comprise a processor for aggregating the continuous time binary analog signals from all the pixels to produce a frame free video stream and a continuous time display array for displaying the frame free video stream. In such a system, the photodiode has a capacitance and the capacitance of the photodiode functions as a charge integrator. The modulator circuit may comprise a continuous time sigma delta modulator.

The present invention also encompasses a pixel for a continuous time imaging sensor array. The array may be made up of a plurality of pixels, each of which may comprise a photodiode for capturing incident photons to produce a continuous time analog signal without any discontinuity in time and a sigma delta modulator circuit for modulating the continuous time analog signal into a continuous time binary analog signal. The photodiode has a capacitance and the capacitance of the photodiode functions as a charge integrator. The continuous time binary analog signals from all pixels in the imaging sensor array are aggregated to produce a frame free video stream.

Various embodiments of the system and pixel of the present invention may also encompass the features and functionality of the method embodiments discussed above.

BRIEF DESCRIPTION OF THE DRAWINGS

The present invention will hereinafter be described in conjunction with the appended drawing figures, wherein like reference numerals denote like elements, and:

FIG. 3 shows an example embodiment of a high-level frame free video process in accordance with the present invention;

FIG. 4 shows a further example embodiment of a frame-free video process in accordance with the present invention;

DETAILED DESCRIPTION

Figure 1:
FIG. 1 shows a prior art image of the first motion capture on film.
Figure 2:
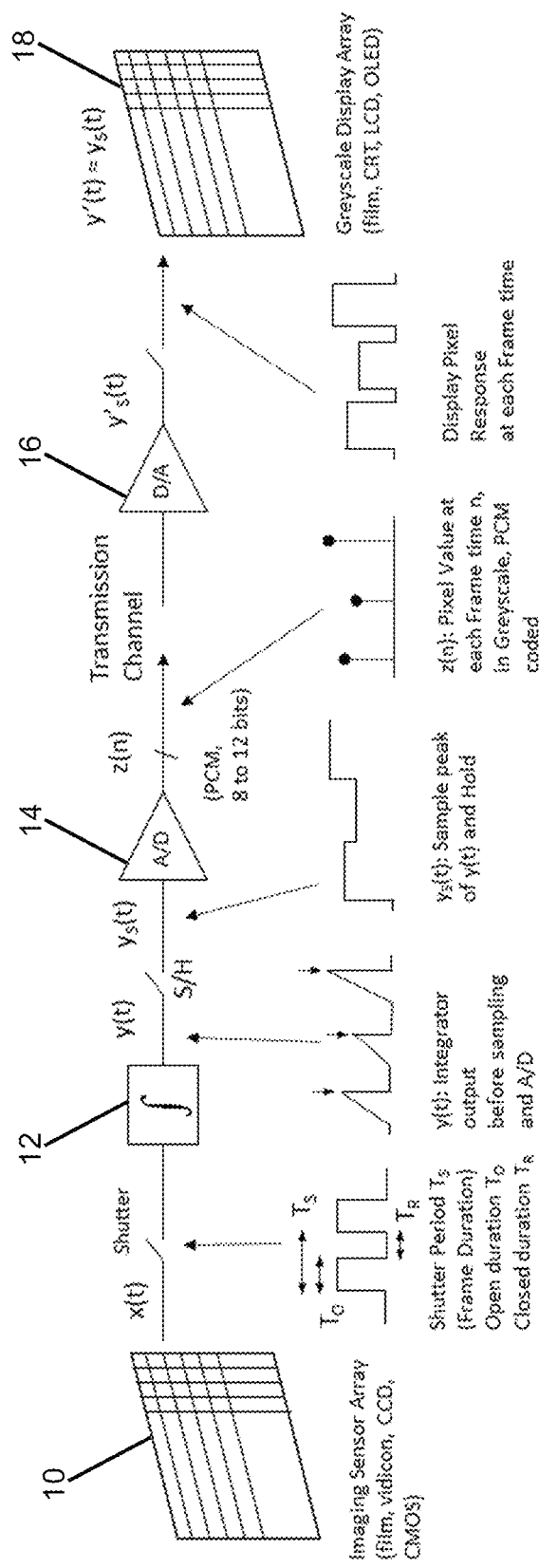
FIG. 2 shows an example of a prior art frame-based video process.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, apparatus, and systems for representing video in continuous time, also referred to herein as "frame-free video". Frame-free video refers to the fact that the video is captured without using traditional "frames" but rather as a continuous time representation, without any frame breaks.

Frame free video results in the capture and display of motion without the traditional frame breaks of frame-based video. The inventive process is based on the principal that frame rate is not fundamental in capturing motion, as the human eye does not have a frame rate. High temporal bandwidth is desirable, however.

Thus, frame free video is based on capturing video where the concept of frame rate is not used. Instead, video is captured in continuous time without any frame boundary. Sampling and digitization operations are performed, but these do not result in a traditional "frame". However, many samples (e.g., bit-planes) can be aggregated to reproduce a traditional frame if desired, in which case the frame boundary can be arbitrarily defined to suit the needs of the intended application. The continuous time video may be modulated into an oversampled signal representation using sigma delta modulation (SDM). The corresponding display can also use sigma delta modulation to reproduce the original video. Integration (LPF) that happens in the eye reproduces the complete scene.

Frame free video provides many advantages over frame-based video. Such advantages include:
More accurate representation of the real world
    No aliasing error
    No loss of photons, no missing information
    Signal captured is continuous, analytic, differentiable, virtually analog
    Closest to how human eye works
    Improved realism
    Potentially easier to compress
    Suitable for computer vision analysis
Improved camera capability
    In-pixel A/D conversion, producing digital readout and less circuit noise
    HDR, High Dynamic Range (potentially 1 to 2 orders of magnitude improvement)
    Adaptive exposure time for still images, possibly motion adaptive
    Signal to Noise Ratio (SNR) very high at slow motion, moderate at fast motion
    Eye tracking of fast-moving objects results in high SNR Avoids multiple trailing edges when eye tracks a moving object
Transcoding for backward compatibility
Easy conversion to and from frame based PCM video
Motion adaptive denoising, blur control possible
All digital display possible using SDM, that maps exactly what the camera produced
Low delay from camera to display, for low latency applications
RPV, drones, autonomous driving, computer games, anything involving fast reaction time The frame free video camera sensor array may be a retrofit to an existing CMOS sensor array (e.g., with some circuit changes). The frame free video display array may be implemented with existing display technologies that offer fast binary modulation of pixels.

Frame free video may be implemented as an end-to-end system, starting with continuous photon capture, all the way to a native frame free video display system. Frame-based video requires integration in the human eye to see continuous motion. Frame Free Video causes integration in the eye as well, but requires less effort and produces less artifacts. In the frame free video process, a 1-bit oversampled representation of photon flux on each pixel is produced. If needed, the signal can be re-modulated after gamma correction, color processing, etc. or to higher order SDM. Second or third order SDM at the pixel level is also possible with more transistors. Charge mode sensing of the photodiode, direct modulation into SDM without conversion to voltage can all be implemented. Charge mode feedback to the photodiode that avoids diode reset is used to keep the photodiode constantly biased and to avoid a gap between samples. This also reduces chances of non-linearity and photodiode saturation, and leads to high dynamic range. The system advantageously produces an all digital readout of pixel values, without the need for an analog sense amplifier for the imaging array, resulting in less noise.

In many cases, there is no shutter needed at the sensor level. A shutter introduces unwanted time aliasing, unless a specific visual effect is desired. The system may include electronic gain control by way of changing the feedback gain in the SDM loop, e.g., for low light situations. A continuous time SDM typically incorporates an op-amp circuit to implement an integrator. This op-amp supply current may be increased for high photon flux. Alternatively, the op-Amp bias current may be modulated on and off with an adaptable duty cycle to save power consumption. For example, a lower on/off frequency or shorter "on" duty cycle may be used when the photon flux is low. SDM modulation rate may be dynamically adjusted to avoid saturation and to increase dynamic range and SNR. SDM modulation rate can also be changed to adapt to different motion bandwidth needs. Mechanical or electronic iris (or dimming) may be employed for intense lighting conditions. For extremely intense lighting conditions, the op-amp integrator input can be reconfigured to integrate only a portion of the photodiode current during each SDM clock cycle.

With the present invention, manipulation is possible in the SDM bit-stream domain. For example: temporal filtering (time domain blur or sharpening) and re-modulation back to SDM; motion axis filtering (in the direction of motion) and remodulation back to SDM; color space conversion, matrixing, and remodulation back to SDM; gamma correction and remodulation back to SDM; video gain and offset control, and remodulation back to SDM, and the like.

In some cases, the continuous time video may be represented by a series of SDM binary bit-planes without any frame boundary, which can be displayed directly by a display that displays SDM binary bit-planes. In some cases, all photons are captured without any discontinuity. In such cases, the photodiode is never reset, and the diode voltage is kept constant.

In an ideal conceptualization of the present invention, as shown in FIG. 3, a continuous time imaging sensor array 20 is used to map, continuously in time for each pixel, the pixel value x(t) (photons incident on the pixel) directly to a continuous time display pixel value x'(t) for display at a continuous time display array 40. However, many factors reduce the bandwidth of x(t), including the sensor response speed of the imaging sensor array 20, the communications channel bandwidth, and the display pixel response at the display array 40. Also, accurately transferring all the analog pixel values from the sensor array to the display array is very difficult through a single communications channel. Temporarily and permanently storing the analog pixel values is difficult as well without some form of digitization. Thus, such an implementation is conceptually possible but not practical.

FIG. 4 shows a more practical embodiment of the present invention. In the FIG. 4 example embodiment, a continuous time sigma delta modulator (SDM) 22 is employed between the imaging sensor array 20 and the display array 40. In the FIG. 4 embodiment, the output x(t) for each pixel of the sensor array 20 is a continuous time analog signal. The continuous time analog signal x(t) is modulated by the continuous time SDM at high clock rate to produce y(t), which is a continuous time binary analog signal. Y(t) can be digitized into a discrete time binary digital signal z(n) for transmission and storage. The signal y(t) contains x(t), with additive noise that can be filtered out by a low pass filter (LPF). The display array 40 reproduces y'(t), an approximation of y(t). The human visual system (HVS) filters out the noise in y(t), and sees a close approximation of x(t). The LPF operation becomes easier as the SDM clock rate is increased.

Figure 5:
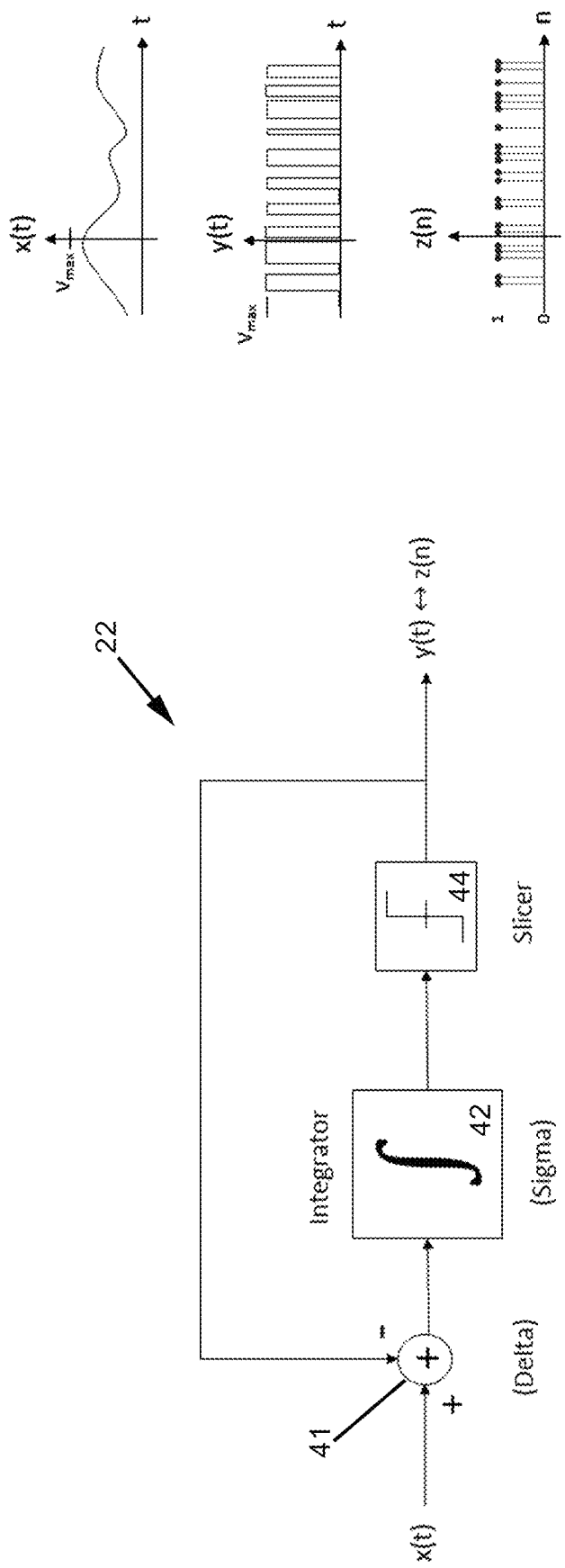
FIG. 5 shows an example embodiment of basic first order continuous time sigma delta modulator in accordance with the present invention.

FIG. 5 shows an example embodiment of a basic first order continuous time sigma delta modulator 22 in accordance with the present invention, which comprises an integrator 42 and a slicer 44, that can be employed in the system of FIG. 4. The photodiode signal x(t) is integrated continuously in time by the integrator 42. The resultant signal is then fed into a slicer 44, which outputs the continuous time binary analog signal y(t), which can then be digitized to produce the discrete time binary digital signal z(n). A feedback loop is provided between the output of the slicer 44 and the input of the integrator 42 such that the integrator 42 operates only on the difference signal produced by the delta operation (e.g., performed by a differential amplifier circuit). This completes the SDM loop that keeps the integrator stable, and produces y(t) representing the continuous time binary analog signal that closely approximates the photodiode signal x(t).

Figure 6:
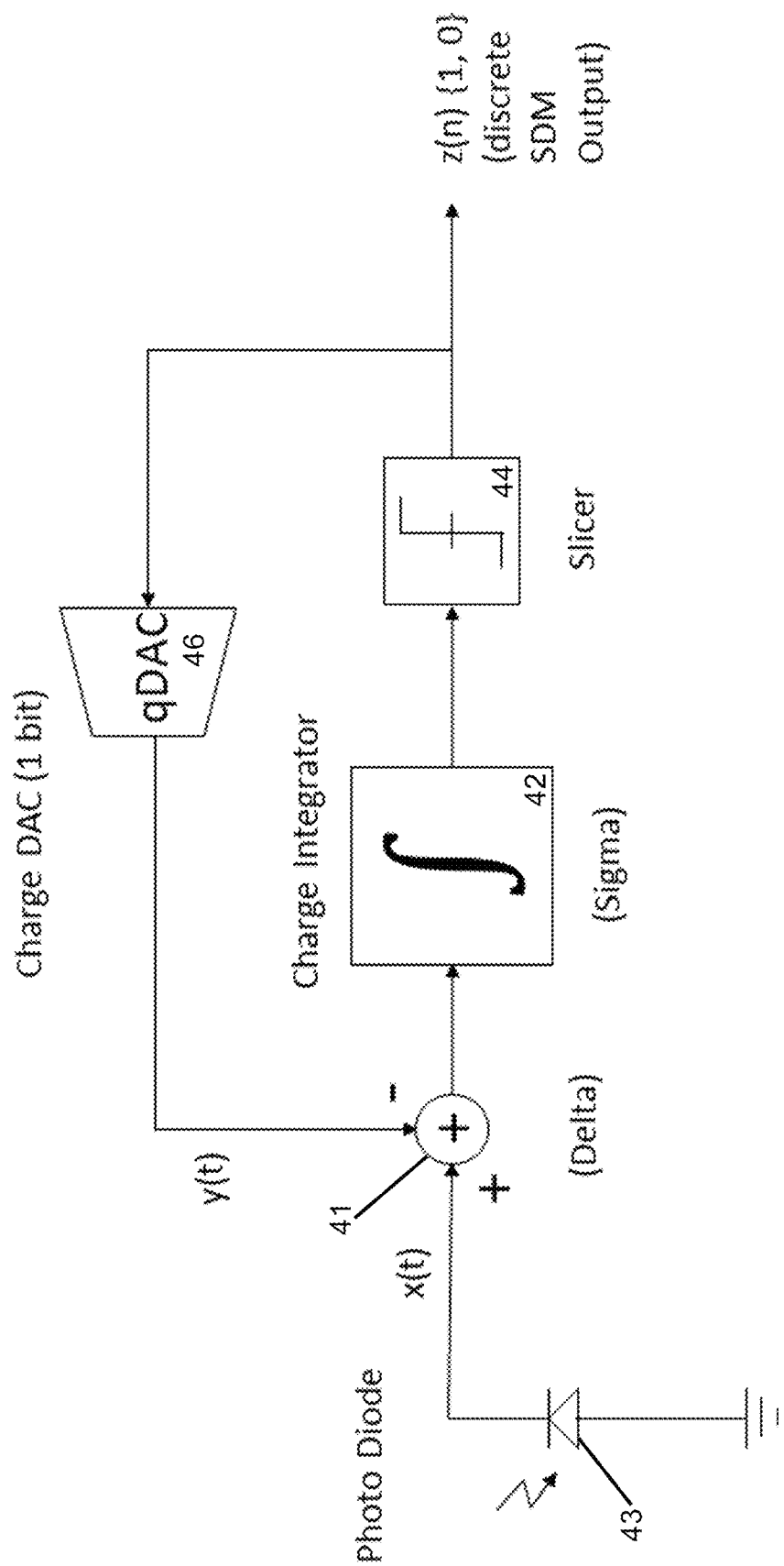
FIG. 6 shows an example embodiment of a high-level pixel design in accordance with the present invention.

FIG. 6 shows an example embodiment of an individual pixel circuit of a sensor array 20 which comprises a high-level SDM design in accordance with the present invention. The pixel circuit of FIG. 6 includes the photodiode 43 which outputs the signal x(t) into a delta operation 41. In this example embodiment, the feedback loop now includes a charge DAC (digital to analog converter) which produces the signal y(t) from the output of the slicer 44 for subtraction from the input signal x(t). In this embodiment, x(t) and y(t) are represented in current, not voltage.

It is important to note that the photodiode is not reset and the integrator 42 is not reset either. It is possible to view that the integrator output is A/D converted using a 1-bit A/D converter, which is the slicer 44 (threshold to high or low binary decision). In that case, the quantization error is rather large. The advantage of the SDM loop is that the quantization error is fed-back to the integrator 42, which gets combined with the next input value. This error value in each cycle gets integrated over time, and averages out so that a very high SNR can be achieved. In contrast, in frame-based systems, the quantization error in one cycle (frame time) gets lost, due to the reset process, and the SNR is limited by the resolution of the A/D converter, typically 8-bits.

It should also be appreciated that a traditional implementation of an SDM is in voltage. However, with the present invention, the SDM circuit is either charge or current based (which are interchangeable in a real implementation). Signal y(t) is shown as a plot of current output. Current integrated over a period of time is charge.

Figure 7:
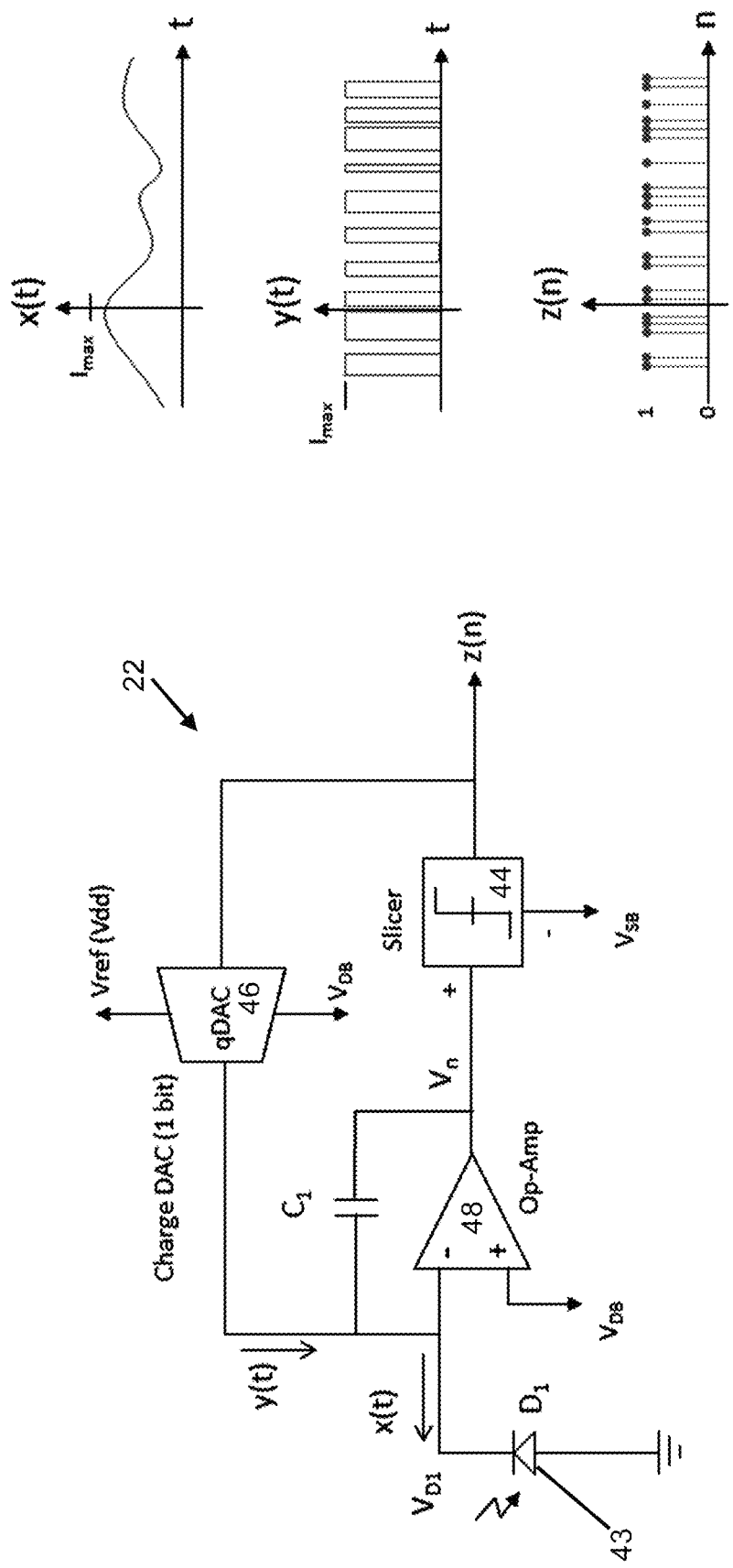
FIG. 7 shows a further example embodiment of a pixel design in accordance with the present invention where the charge integration is accomplished by an inverting op-amp integrator.

FIG. 7 shows a further example embodiment of a pixel circuit with a more detailed SDM design than that of FIG. 6, in accordance with the present invention. In FIG. 7, the SDM comprises a 1-bit continuous time sigma delta modulator in the charge domain, which employs an inverting op-amp charge integrator circuit.

It should be appreciated that in various embodiments of the present invention, the sigma delta modulator comprises a feedback-based charge integrator that is connected to the photodiode. The photodiode is not reset throughout the operation of the imaging array. Continuous feedback from the feedback-based charge integrator maintains a constant photodiode voltage.

The photodiode current x(t) is integrated continuously in time without saturating the photodiode 43 by the feedback-based charge integrator to produce an integrated value which represents total photons converted to electrical charges. Each time the integrated value exceeds a threshold value, a fixed value is subtracted from the integrated value to bring the integrator output to below the threshold. The series of subtracted values over time results in a close approximation of the total integrated value, enabling the sigma delta modulator to produce the continuous time binary analog signal y(t) that can be mapped to the discrete time binary digital signal z(n).

As shown in FIG. 7, the sigma delta modulator further comprises an op-amp 48 with a non-inverting input held at a constant voltage and an inverting input coupled to an output of the photodiode 43. The op-amp 48 outputs the integrated value. A feedback capacitor $C_1$ is coupled to an output of the op-amp 48 and the output of the photodiode 43 to maintain the constant photodiode voltage. The slicer 44 is coupled to the output of the op-amp 48 for determining whether the integrated value from the op-amp 48 output exceeds the threshold value. The slicer output comprises the discrete time binary digital signals z(n). A charge digital to analog converter (qDAC) 46 is coupled to an output of the slicer 44 and the inverting input of the op-amp 48 which produces the fixed value to be subtracted.

It should be noted that the slicer output can often be considered an analog signal y(t). However, in a practical implementation, it is easier to obtain the digital signal z(n) from the slicer, and then insert a D/A converter (charge DAC 46 in FIG. 7) in the feedback loop to generate y(t).

With the present invention, the signal y(t) is a continuous time binary analog signal produced by the slicer 44 and the qDAC 46, and z(n) is the discrete time binary digital signal produced by the slicer 44. In certain implementations, sometimes the slicer can generate y(t) directly if it produces the right two voltage levels, but with the present invention, since charge injection is needed, it is advantageous for the slicer to output the digital signal z(n) and employ a charge DAC to generate y(t).

The photodiode 43 is reverse biased at $V_{D1}$ (indirectly by the op-amp voltage $V_{DB}$). As the photodiode 43 receives photons, the photo electric current x(t) is generated. This in turn discharges the built-in capacitance of this reverse biased diode 43. Diode voltage $V_{D1}$, which is connected to the negative input of the Op-Amp 48, would drop. The feedback from the Op-Amp 48 charges up the capacitor $C_1$ to keep its negative input $V_{D1}$ constant at $V_{DB}$. This results in the photo electric current being transferred to the integrator capacitor $C_1$. The end result is that the photo electric current x(t) from the diode is continuously accumulated in $C_1$ while keeping the diode voltage $V_{D1}$ held constant at $V_{DB}$. This forms the "charge domain integrator" part of the SDM circuit.

The feedback capacitor $C_1$ accumulates the charge for the charge-based SDM. Voltage on the capacitor is the total charge divided by its capacitance. In order to maintain a fixed voltage on the photodiode 43, the output voltage of the op-amp 48 changes by this capacitor voltage.

Assuming the Op-Amp 48 has a high gain, the diode bias voltage $V_{DB}$ applied to the positive input of the Op-Amp 48 will keep the negative input of the Op-Amp also at $V_{DB}$. The voltage output of the Op-Amp 48 is proportional to the total charge accumulated into $C_1$. Once the integrator output (Op-Amp output) exceeds a threshold set by $V_{SB}$, the Slicer 44 makes a one-bit decision and outputs z(n)=1. The qDAC 46 produces y(t), a fixed amount of charge that gets subtracted from the integrator. This discharges $C_1$ without changing the diode voltage, due to the Op-Amp feedback. When the Slicer decision z(n)=0, no charge is subtracted from the integrator. This outer feedback (SDM feedback) keeps the integrator output stable, within the set voltage range centered around $V_{SB}$. This Slicer decision z(n) is also the output of the FFV pixel at that time instance (SDM clock). Each 1-bit decision z(n) from an array of pixels in an image sensor form the "SDM bit-plane", for an L×M array. The frame free video stream is comprised of a series of these SDM bit-planes in time, with L×M binary values per bit-plane.

It should be noted that there are a number of alternative ways to connect the photodiode to the inverting op-amp charge integrator in FIG. 6. One alternative would be to connect the anode of the photodiode to the inverting input of the op-amp and connect the cathode of the photodiode to another voltage. Another alternative would be to connect the anode of the photodiode to another voltage instead of the ground. Yet another alternative would be to connect the anode of the photodiode to the non-inverting input of the op-amp. They all lead to the continuous integration of the photo current from the photodiode but may provide different design optimizations, including linearity and dark current.

Because the photon has been integrated continuously without a gap in time, the frame free video is an analog representation of the photon flux at each pixel. It should be noted that the representation is a continuous time analog representation but has a large amount of noise introduced, where noise is mitigated by oversampling.

The over sampling ratio (OSR) determines the quality of the signal. A useable range is typically between 8× to 128× for video. For a 60 Hz (FPS) conventional video, the highest motion bandwidth allowed is 30 Hz. At 16×OSR, frame free video will have 960 Hz bit-plane rate (SDM clock rate), which allows a motion bandwidth up to 480 Hz.

The integrator in the frame free video pixel is a low-pass filter in the continuous time domain. It avoids aliasing that is present in conventional frame-based video. The Human Visual System (HVS) has a bandwidth that peaks around 20 Hz, and drops off to zero around 60 Hz. HVS (naked eye) will provide sufficient temporal filtering to see the original video content from the FFV stream, but not the noise.

Figure 8A:
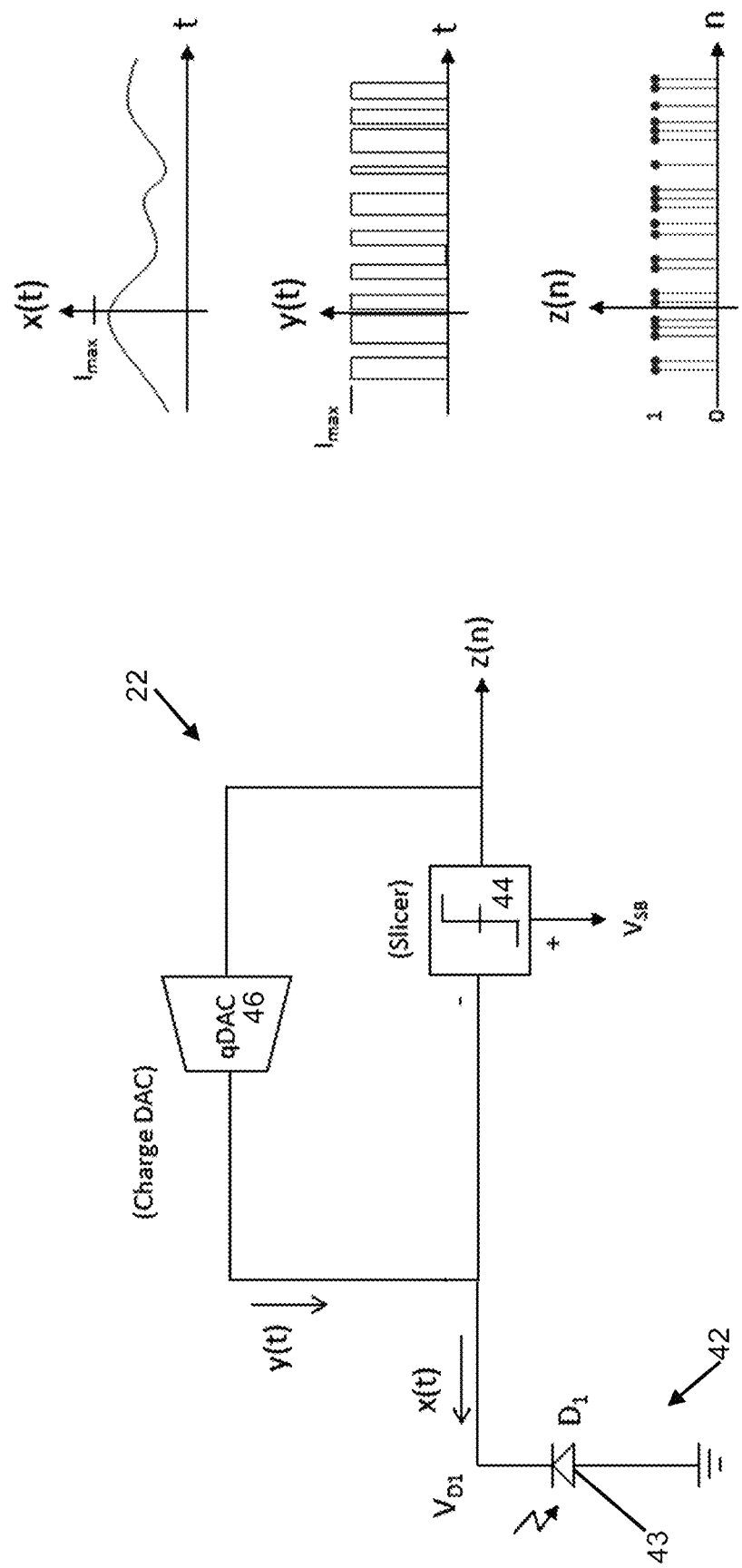
FIG. 8a shows a further example embodiment of a pixel design in accordance with the present invention where the charge integration is accomplished by the capacitance of the photodiode.
Figure 8B:
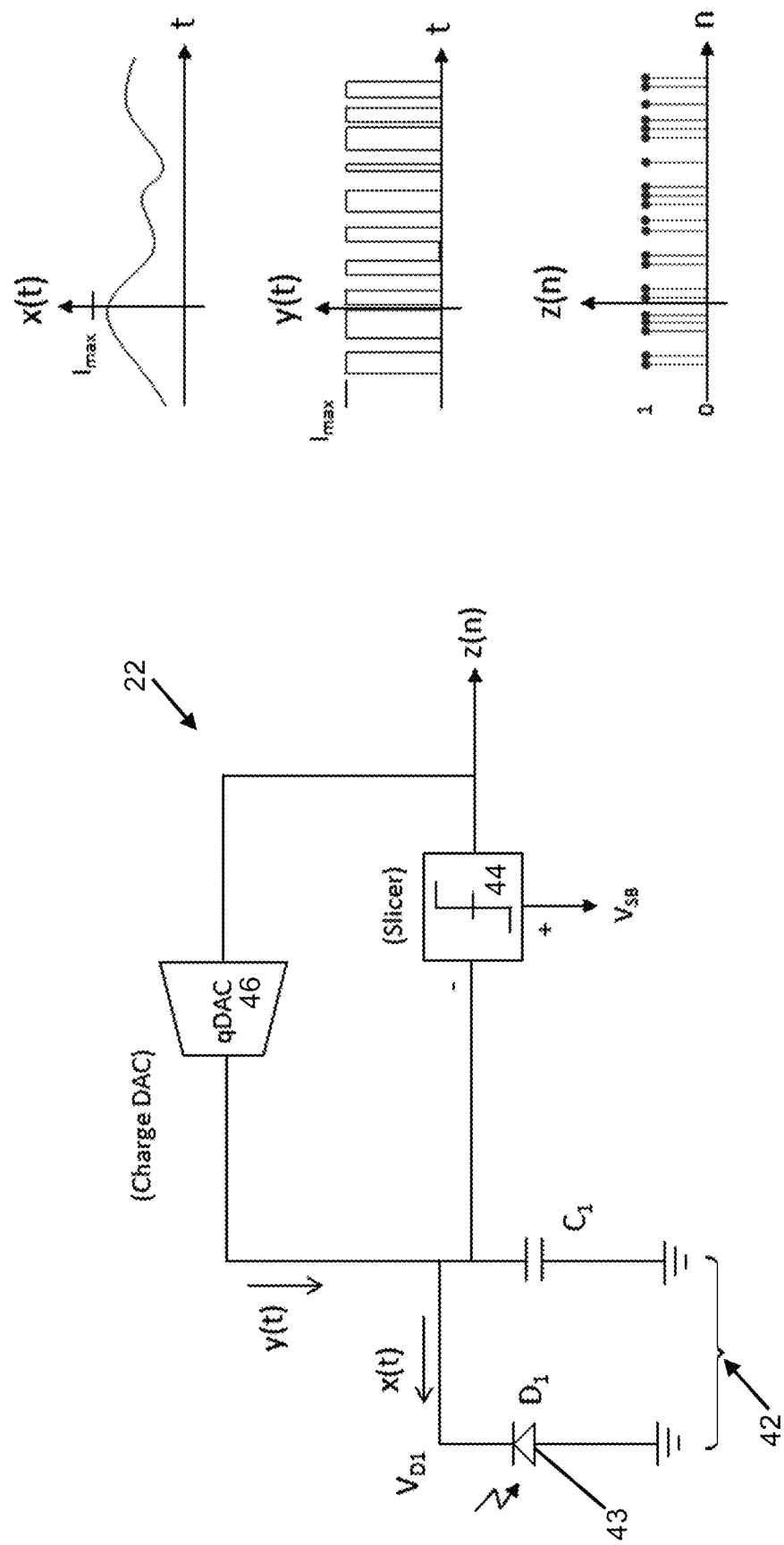
FIG. 8b shows a further example embodiment of a pixel design in accordance with the present invention where the charge integration is accomplished by a capacitor in parallel with the photodiode.

FIGS. 8a and 8b show further example embodiments of a pixel circuit with a simplified SDM design as compared to that of FIG. 7, in accordance with the present invention. In FIG. 8a, the SDM comprises a 1-bit continuous time sigma delta modulator in the charge domain as in FIG. 7, but without the op-amp charge integrator circuit and the feedback capacitor of the FIG. 7 design. In FIG. 8a, the capacitance of the photodiode 43 functions as the charge integrator. In FIG. 8b, the op-amp charge integrator circuit and the feedback capacitor are replaced by a simple capacitor $C_1$ in parallel with the photodiode 43, with the photodiode capacitance and the capacitor functioning as the charge integrator 42.

The embodiments shown in FIGS. 8a and 8b provide a more sensitive slicer circuit with a higher SDM (qDAC) update rate, which keeps $V_{D1}$ close to $V_{SB}$ with the slicer 44 biased at $V_{SB}$. As in the FIG. 7 embodiment discussed above, the signal x(t) is the current flowing into the reverse biased photodiode 43 when the diode 43 is exposed to light. The signal y(t) is a continuous time binary analog signal produced by the slicer 44 and the qDAC 46, and z(n) is the discrete time binary digital signal produced by the slicer 44. The output of the photodiode in FIG. 8a (or the combined output of the photodiode and capacitor C1 in FIG. 8b) is non-inverting and so is connected to the negative input of the slicer 44 (whereas the op-amp 48 of the FIG. 7 embodiment is inverting and so is connected to the positive input of the slicer 44). Signals z(n) and y(t) (output of qDAC 46) add charge (positive current) to the integrator 42 (e.g., the photodiode with or without the capacitor $C_1$) in a manner to compensate for the charge (current) taken out of the integrator by the photo diode. If the integrator 42 is too low, it adds a fixed amount of charge. If the integrator is high, it skips the cycle and waits for the photo diode to bring it low. This feedback keeps the integrator stable, by keeping it within a narrow range.

The design of FIGS. 8a and 8b can be implemented with fewer transistors and reduced power consumption as compared to the design of FIG. 7. Replacing the op-amp with the diode capacitance and/or one or more capacitors eliminates power otherwise consumed by the op-amp. The slicer 44 can be implemented such that current is only used when switching or making a decision. The charge DAC (qDAC) 46 can be duty cycled to reduce power consumption, especially for low light conditions (low photo current), but still has to cancel out the total photo current to keep the SDM feedback loop working. It is also possible to clamp the photodiode 43 (duty cycled) by additional transistors such that part of the photo current gets dumped. Doing so may reduce the current consumption in extremely high illumination conditions.

In an example embodiment of a method of representing video in continuous time in accordance with the present invention which uses the pixel circuit shown in FIG. 8a, the method may comprise continuously capturing photons incident on pixels in an imaging array using a continuous time imaging sensor array 20 (see FIG. 14) to produce respective continuous time analog signals x(t) without any discontinuity in time. At each pixel, the respective continuous time analog signal x(t) is modulated into a respective continuous time binary analog signal y(t).

The continuous time binary analog signals y(t) from all pixels are aggregated to produce a frame free video. Each pixel may comprise a continuous time sigma delta modulator 22 and a photodiode 43 having a capacitance. At each pixel, the respective continuous time analog signal x(t) is modulated using the continuous time sigma delta modulator 22 to produce the respective continuous time binary analog signal y(t). The capacitance of the photodiode 43 functions as a charge integrator 42.

The sigma delta modulator 22 may be one of charge-based or current-based.

At each pixel, the continuous time binary analog signal y(t) may be mapped to a discrete time binary digital signal z(n) consisting of 1's and 0's. The discrete time binary digital signals z(n) from all of the pixels may be aggregated in the imaging array to produce a corresponding binary bit-plane per each clock cycle of the sigma delta modulator to convert the frame free video to a frame free video stream. The frame free video stream may comprise a time series of the binary bit-planes (as discussed in detail below in connection with FIG. 14).

The frame free video stream may be converted into a frame free video signal by at least one of manipulating, format converting, encoding, transcoding, compressing, storing, transmitting, and otherwise representing the frame free video stream.

The binary 1's and 0's from the discrete time binary digital signal may be mapped to a maximum value and a minimum value, respectively, to enable continuous time video processing or display.

The photodiode 43 is not reset throughout the operation of the imaging array. The charge integrator 42 maintains a voltage range of the photodiode 43 corresponding to a sum of a current of the photodiode 43 and a negative of a feedback current of the sigma delta modulator 22. The voltage of the photodiode 43 voltage is proportional to the total charge, V=Q/C, but the capacitance of the photodiode can be voltage dependent.

The current of the photodiode is integrated continuously in time without saturating the photodiode by the charge integrator 42 to produce an integrated value which represents total photons converted to electrical charges. Each time the integrated value exceeds a threshold value, a fixed value is subtracted from the integrated value to enable the charge integrator 42 to operate within an operating range. The series of subtracted values over time may result in a close approximation of the total integrated value, enabling the sigma delta modulator 22 to produce the continuous time binary analog signal y(t).

Those skilled in the art will appreciate that the subtracting of the fixed value from the integrated value may actually encompass "adding" of the fixed value, depending on the sign of the integrated quantity. If the photo current is subtracting from the charge integrator 42, we subtract a negative feedback value which is the same as adding to the charge integrator 42. A typical SDM modulator assumes the input signal is adding to the integrator and the feedback signal subtracts from the integrator. In practice, the photo current does "add" electrons to the capacitor integrator and the feedback qDAC "subtracts" electrons, which are negatively charged.

In an example embodiment as shown in FIG. 8b, the charge integrator 42 may comprise the capacitance of the photodiode 43 and a capacitor $C_1$ in parallel with the photodiode 43 and coupled to an output of the photodiode 43. Alternatively, the charge integrator 42 may comprise the capacitance of the photodiode 43 and one or more capacitors $C_1$ in parallel with the photodiode 43 and coupled to an output of the photodiode 43.

The optional capacitor $C_1$ would increase the total capacitance of the charge integrator 42, when the capacitance of the photodiode alone is not sufficient. With the added capacitor, the integrator 42 will be able to store more charges, which therefore increases the dynamic range (which can be useful when the scene is very bright—i.e., more incident photons).

The sigma delta modulator may 22 comprise: a slicer 44 coupled to the output of the charge integrator 42 for determining whether the integrated value from the charge integrator output exceeds the threshold value, the slicer output comprising the discrete time binary digital signals z(n); and a charge digital to analog converter (qDAC) 46 coupled to an output of the slicer 44 and to the charge integrator 42, which produces the fixed value to be subtracted each time the integrated value exceeds a threshold value, enabling the charge integrator 42 to operate within an operating range.

The discrete time binary digital signals z(n) output by the slicer may be mapped to the continuous time binary analog signals y(t) by the qDAC 46.

The sigma delta modulator 22 may have an output which is 1-bit binary valued. Alternatively, the sigma delta modulator 22 has an output which is more than 1-bit binary valued.

It should also be appreciated that if the photodiode 43 is operated at near zero volts, the dark current will be extremely small. Conventional CMOS image sensors reset the reverse diode voltage to a fixed value, to at least 2 to 3 volts at the beginning of the frame. The photo current reduces this voltage and the diode voltage drop is measured at the end of the frame time. This incurs a lot of noise in a dark part of the image where the voltage drop is small.

At very high illumination conditions, it is acceptable to increase the voltage (reverse bias) since the dark current will be relatively small compared to the photo current. This provides a wider linear range before diode saturation, therefore a high dynamic range A small diode voltage fluctuation may occur and is acceptable, since the photo current is extremely linear to illumination, and not affected by the diode voltage, unless the illumination level is extremely high. This is one of the key advantages of charge-based sensing, rather than voltage-based sensing of current CMOS sensors. In a real implementation in CMOS, the photodiode capacitance might be sufficiently high relative to rest of the circuit elements, and the C1 integrator capacitor may not be needed.

Figure 9:
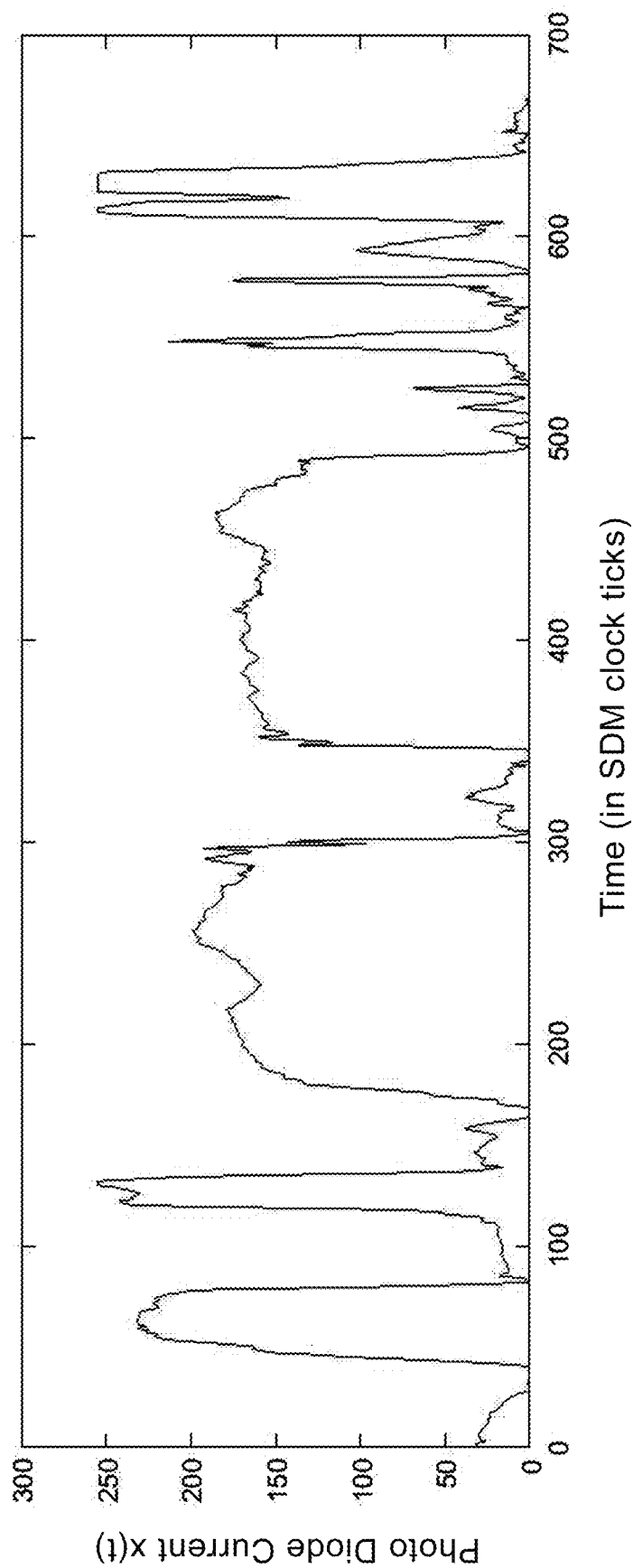
FIGS. 9-11 show example plots of operation of a single frame free video pixel in accordance with the present invention.
Figure 10:
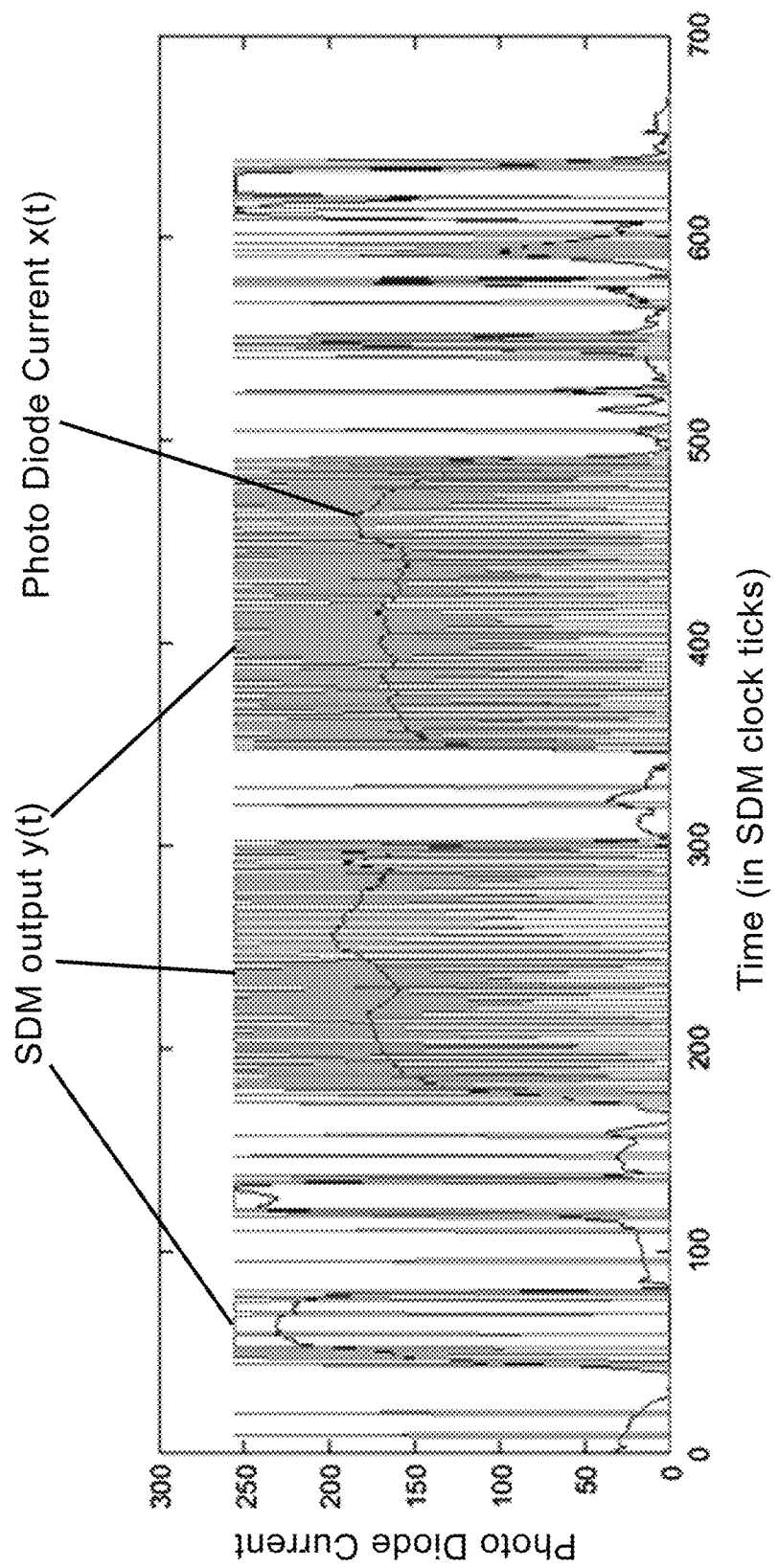
Figure 11:
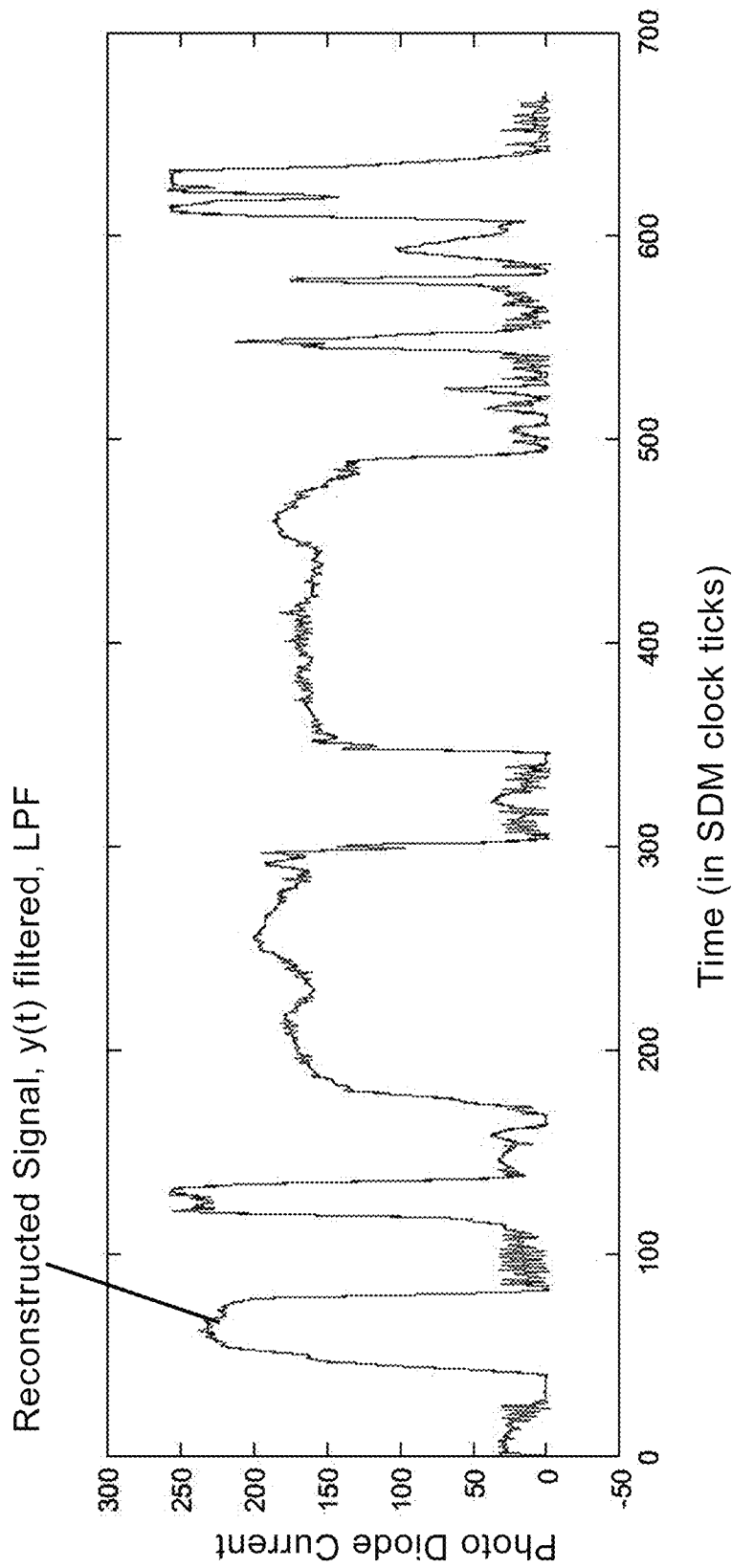

The plots at FIGS. 9-11 show an example of a single FFV pixel operation. FIG. 9 shows a simulated photo current into the photodiode, x(t), plotted against time in clock cycles. Each value represents a brightness at that pixel location at that time instance.

FIG. 10 shows the FFV pixel SDM output y(t) at the oversampling ratio (OSR) of 1× as an overlay on top of the FFV photodiode current of FIG. 9. The signal z(n) is the discrete version of the signal y(t). The SDM output y(t) is binary valued. $I_{max}=255$. In this plot, either y(t)=255 (z(n)=1) or y(t)=0 (z(n)=0).

FIG. 11 shows the reconstruction from the FFV pixel SDM output y(t) for an oversampling ratio (OSR) of 8×. The clock rate has increase by 8×, generated 8× more data, which was filtered and decimated by 8× to match the input time scale. Most of the reconstruction noise is in the high frequency, which improves as OSR increases.

Figure 12:
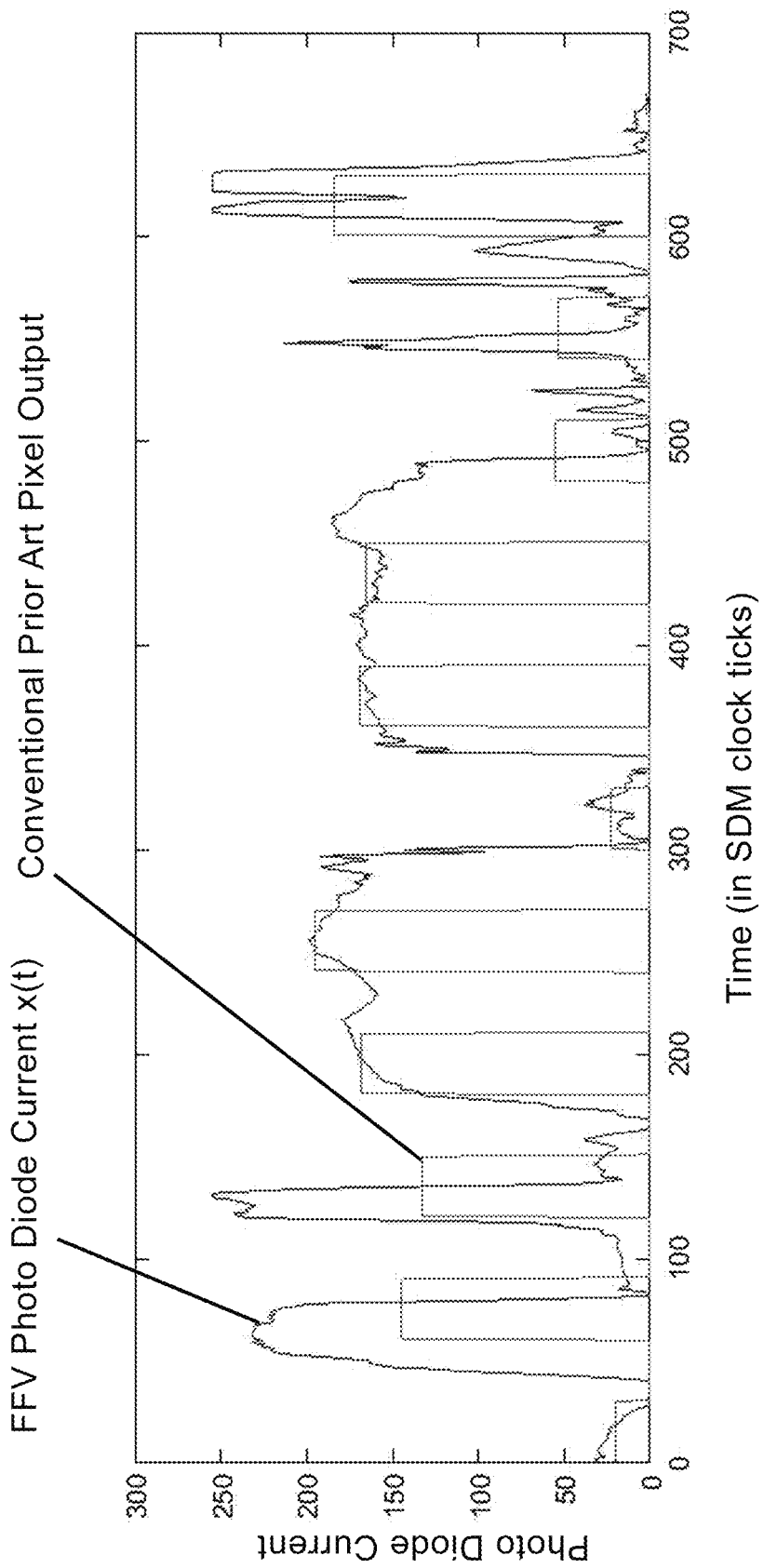
FIG. 12 shows an example of output from a prior art conventional pixel.

FIG. 12 shows a simulation of an output of a conventional (prior art) imaging pixel with a shutter opening at 50% duty cycle as an overlay on top of the FFV photodiode current of FIG. 9. Notice that the output values do not always track the input because of the frame boundary and short shutter duration. In this example, a low frame rate was chosen for easier illustration.

Figure 13:
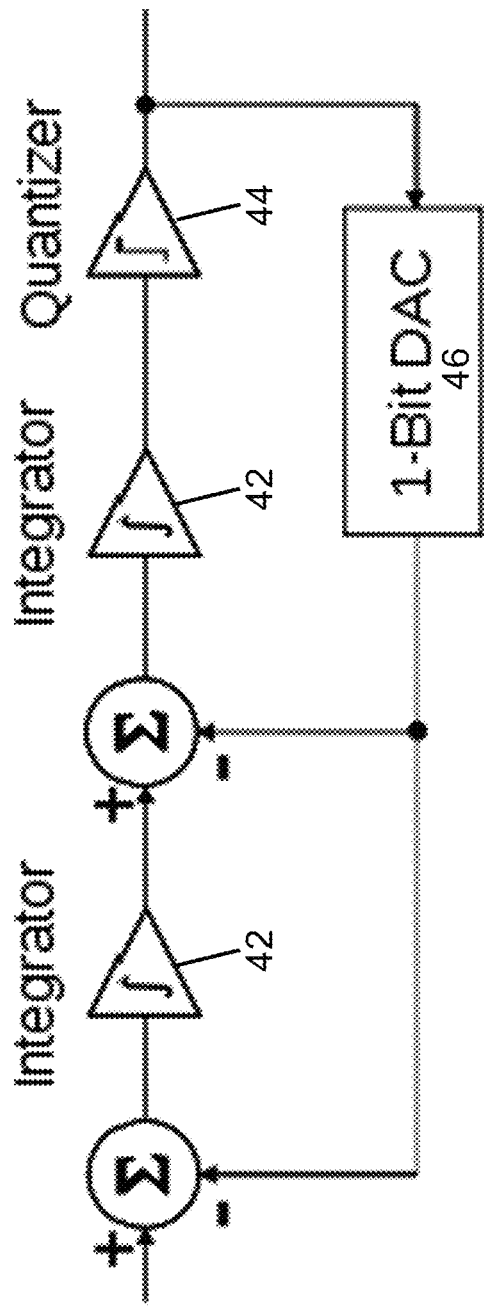
FIG. 13 shows an example of a prior art second order continuous time sigma delta modulator which may be used in an example embodiment of the present invention.

FIG. 13 shows a prior art of a second order sigma delta modulator that can be utilized in the pixel circuitry of the present invention. In the FIG. 13 embodiment, two integrator circuits 42 are arranged in series with the DAC 46 in a feedback loop which feeds into the input of the first integrator 42 and the input of the second integrator 42. The second order SDM typically provides an improved signal-to-noise ratio (SNR) for the same OSR compared to a first order SDM circuit, or a similar SNR for a reduced OSR compared to the first order SDM. A disadvantage with the second order SDM is a reduced dynamic range in order to prevent loop instability and a higher circuit complexity. An alternative would be to have a first order SDM modulator at the pixel and implement a re-modulation elsewhere, to convert it to second order or higher order SDM.

Those skilled in the art will appreciate that present invention can be implemented with higher order SDMs as well.

Figure 14:
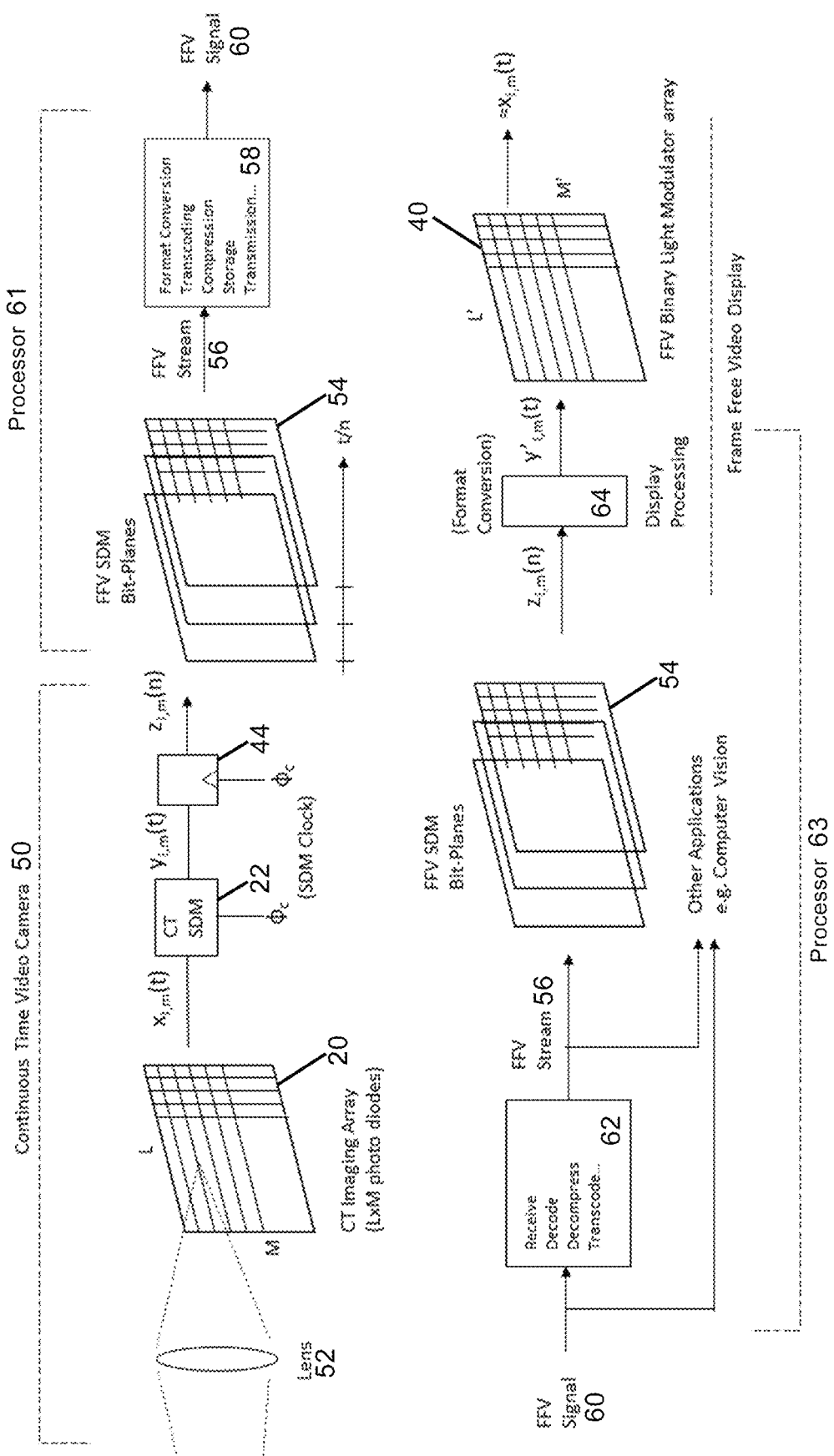
FIG. 14 shows an example embodiment of a frame free video system in accordance with the present invention.

FIG. 14 shows an example embodiment of end-to-end frame free video system in accordance with an example embodiment of the present invention. A continuous time video (CTV) camera 50 may comprise a lens 52 and a continuous time imaging sensor array 20 comprising L×M pixels, for continuously capturing photons incident on pixels of the imaging array to produce respective continuous time analog signals without any discontinuity in time. Each of the pixels of the imaging array 20 may comprise a photodiode and a modulator circuit (as discussed above) for modulating the respective continuous time analog signal into respective continuous time binary analog signal. For example, the pixel circuit for each pixel in the sensor array may be as shown in FIGS. 5, 6, 7, 8a and 8b and discussed above.

A processor 61 may be provided for aggregating the continuous time binary analog signals from all the pixels to produce a frame free video stream. A continuous time display array 40 for displaying the frame free video stream may comprise an L'×M' array of light modulators. Each light modulator may be responsive to the SDM digital output of the corresponding pixel in the imaging array.

As discussed in detail above, for each pixel, the incident photon is integrated and converted to photo electric current x(t) continuously in time without photodiode reset or interruption. The SDM 22 converts the variation of the photo electric current at each pixel into a continuous time binary analog signal y(t) by continuous time sigma delta modulation. The slicer 44 outputs the discrete time binary digital signal z(n), which may be mapped to the continuous time binary analog signals y(t). The discrete time binary digital signals z(n) output from all pixels in the imaging array 20 can be aggregated into SDM bit-planes 54. A frame free video stream 56 comprising a time series of SDM bit-planes can then be produced. The frame free video stream 56 can then be subjected to various processing 58 (e.g., at processor 61 or other hardware and/or software components) to produce a frame free video signal 60. Such processing may include, but not be limited to, at least one of manipulating, format converting, encoding, transcoding, compressing, storing, transmitting, and otherwise representing the frame free video stream.

The frame free video signal 60 may then be transmitted, received, and subsequently processed 62 (e.g., decoded, decompressed, stored, transcoded, format converted or otherwise processed) to convert the frame free video signal 60 back into frame free video stream 56 (e.g., at processor 63 or other hardware and/or software components). The frame free video stream 56 may be converted back into SDM bit-planes 54 that can be subjected to display processing and format conversion 64 (e.g., at processor 63 or other hardware and/or software components), for display via the display array 40 that comprises L'×M' binary light modulators. The format conversion may include changing the resolution of the original frame free video stream from L×M to L'×M' that corresponds to the display resolution. Further format conversion may include changing the SDM clock rate.

The present invention also encompasses a system for representing video in continuous time comprising the pixel circuit of FIG. 8*a* or FIG. 8*b*. Such a system may comprise a continuous time imaging sensor array 20 for continuously capturing photons incident on pixels of the imaging array to produce respective continuous time analog signals without any discontinuity in time. Each of the pixels comprising a photodiode 43 and a sigma delta modulator circuit 22 for modulating the respective continuous time analog signal into a respective continuous time binary analog signal. The system may also comprise a processor 61 for aggregating the continuous time binary analog signals from all the pixels to produce a frame free video stream and a continuous time display array 40 for displaying the frame free video stream. In such a system, the photodiode 43 has a capacitance and the capacitance of the photodiode 43 functions as a charge integrator. The modulator circuit 22 may comprise a continuous time sigma delta modulator.

The present invention also encompasses a pixel for a continuous time imaging sensor array 20. The array may be made up of a plurality of pixels, each of which may comprise a photodiode 43 for capturing incident photons to produce a continuous time analog signal without any discontinuity in time and a sigma delta modulator circuit 22 for modulating the continuous time analog signal into a continuous time binary analog signal. The photodiode 43 has a capacitance and the capacitance of the photodiode 43 functions as a charge integrator. The continuous time binary analog signals from all pixels in the imaging sensor array 20 are aggregated to produce a frame free video stream.

Various embodiments of the system and pixel of the present invention may also encompass the features and functionality of the method embodiments discussed above.

Those skilled in the art will appreciate that various functionalities of the system may be carried out by one or more processors running on one or more computer devices. For example, the discrete time binary digital signals from all of the pixels in the imaging array may be aggregated by a processor to produce a corresponding binary bit-plane per each clock cycle of the sigma delta modulator to convert the frame free video to a frame free video stream. Encoders, transcoders, and other processing devices and/or software programs may be used for the various processing of the frame free video stream into a frame free video signal and vice versa.

With the present invention, the pixel circuit integrates incident photons continuously in time, without reset. Thus, there is no loss of photons, and no time aliasing. The pixel value corresponds to the number of photons integrated over unit time. The unit time corresponds to the SDM clock period. The SDM modulated output is a continuous time analog signal, its amplitude is quantized to binary values and the amplitude is constant during each SDM clock period. The SDM discrete time output maps those levels to 1's and 0's (binary). For example, a 2 volt level can be coded to a binary 1, and a 0 volt level can be coded to binary 0. The SDM bit-plane is an L×M collection of the discrete SDM output from each pixel. Each SDM bit-plane is produced for each SDM clock. The frame free video stream is the raw data out of the L×M imaging array, equivalent to a series of SDM bit-planes (L×M bits per bit-plane, every clock cycle).

The frame free video signal is an alternative representation of the frame free video stream (e.g., a compressed version of frame free video stream). Format conversion of the frame free video stream includes changing the dimension of the SDM bit-plane (to L'×M') or changing the SDM clock rate for the bit-planes. The binary light modulator at the display 40 reproduces the continuous time analog signal of each SDM pixel, y(t). When the light modulator update rate (SDM clock rate) is fast enough, human eye sees the average brightness and the video is reconstructed in the eye.

The binary 1's and 0's from the discrete time binary digital signal may be mapped to a maximum value and a minimum value, respectively, to enable continuous time video processing or display.

Those skilled in the art will appreciate that the frame free video signal may be used for other than display purposes. For example, such purposes may include but not be limited to artificial intelligence, computer vision, autonomous driving, drones (e.g., where the video information is not for human visual consumption). Because of the nature of alias free, continuous time representation of frame free video, the content is easier to analyze mathematically, especially with respect to motion. Thus, capture and transport of frame free video (as described above) with computer vision analysis is possible, instead of or in addition to the display of the video.

It should now be appreciated that the present invention provides advantageous methods, apparatus, and systems for representing video in continuous time, without frame breaks.

Although the invention has been described in connection with various illustrated embodiments, numerous modifications and adaptations may be made thereto without departing from the spirit and scope of the invention as set forth in the claims.

What is claimed is:

1. A method for representing video in continuous time, comprising:
   continuously capturing photons incident on pixels in an imaging array using a continuous time imaging sensor array to produce respective continuous time analog signals without any discontinuity in time;
   modulating, at each pixel, the respective continuous time analog signal into a respective continuous time binary analog signal; and
   aggregating the continuous time binary analog signals from all pixels to produce a frame free video;
   wherein:
   each pixel comprises a continuous time sigma delta modulator and a photodiode having a capacitance;
   at each pixel, the respective continuous time analog signal is modulated using the continuous time sigma delta modulator to produce the respective continuous time binary analog signal; and
   the capacitance of the photodiode functions as a charge integrator.

2. The method in accordance with claim 1, wherein the sigma delta modulator is one of charge-based or current-based.

3. The method in accordance with claim 1, further comprising:
   at each pixel, mapping the continuous time binary analog signal to a discrete time binary digital signal consisting of 1's and 0's.

4. The method in accordance with claim 3, further comprising:
aggregating the discrete time binary digital signals from all of the pixels in the imaging array to produce a corresponding binary bit-plane per each clock cycle of the sigma delta modulator to convert the frame free video to a frame free video stream;
wherein the frame free video stream comprises a time series of the binary bit-planes.

5. The method in accordance with claim 4, further comprising:
converting the frame free video stream into a frame free video signal by at least one of manipulating, format converting, encoding, transcoding, compressing, storing, transmitting, and otherwise representing the frame free video stream.

6. The method in accordance with claim 3, further comprising:
mapping the binary 1's and 0's from the discrete time binary digital signal to a maximum value and a minimum value, respectively, to enable continuous time video processing or display.

7. The method in accordance with claim 1, wherein:
the photodiode is not reset;
the charge integrator maintains a voltage range of the photodiode corresponding to a sum of a current of the photodiode and a negative of a feedback current of the sigma delta modulator.

8. The method in accordance with claim 7, further comprising:
integrating the current of the photodiode continuously in time without saturating the photodiode by the charge integrator to produce an integrated value which represents total photons converted to electrical charges;
each time the integrated value exceeds a threshold value, subtracting a fixed value from the integrated value to enable the charge integrator to operate within an operating range;
wherein a series of the subtracted fixed values over time results in an estimate of the total integrated value, enabling the sigma delta modulator to produce the continuous time binary analog signal.

9. The method in accordance with claim 8, wherein the charge integrator comprises:
the capacitance of the photodiode; and
a capacitor in parallel with the photodiode and coupled to an output of the photodiode.

10. The method in accordance with claim 8, wherein the sigma delta modulator comprises:
a slicer coupled to the output of the charge integrator for determining whether the integrated value from the charge integrator output exceeds the threshold value, the slicer output comprising the discrete time binary digital signals; and
a charge digital to analog converter (qDAC) coupled to an output of the slicer and to the charge integrator, which produces the fixed value to be subtracted each time the integrated value exceeds a threshold value, enabling the charge integrator to operate within an operating range.

11. The method in accordance with claim 10, wherein discrete time binary digital signals output by the slicer are mapped to the continuous time binary analog signals by the qDAC.

12. The method in accordance with claim 1, wherein the charge integrator comprises:
the capacitance of the photodiode; and
one or more capacitors in parallel with the photodiode and coupled to an output of the photodiode.

13. The method in accordance with claim 1, wherein the sigma delta modulator has an output which is 1-bit binary valued.

14. The method in accordance with claim 1, wherein the sigma delta modulator has an output which is more than 1-bit binary valued.

15. A system for representing video in continuous time, comprising:
a continuous time imaging sensor array for continuously capturing photons incident on pixels of the imaging array to produce respective continuous time analog signals without any discontinuity in time;
each of the pixels comprising a photodiode and a sigma delta modulator circuit for modulating the respective continuous time analog signal into a respective continuous time binary analog signal;
a processor for aggregating the continuous time binary analog signals from all the pixels to produce a frame free video stream; and
a continuous time display array for displaying the frame free video stream;
wherein:
the photodiode has a capacitance;
the capacitance of the photodiode functions as a charge integrator; and
the modulator circuit comprises a continuous time sigma delta modulator.

16. A pixel for a continuous time imaging sensor array, comprising:
a photodiode for capturing incident photons to produce a continuous time analog signal without any discontinuity in time;
a sigma delta modulator circuit for modulating the continuous time analog signal into a continuous time binary analog signal,
wherein:
the photodiode has a capacitance;
the capacitance of the photodiode functions as a charge integrator; and
the continuous time binary analog signals from all pixels in an imaging sensor array are aggregated to produce a frame free video stream.

* * * * *